A. KREGLING.
MECHANICAL MOVEMENT.
APPLICATION FILED FEB. 5, 1917.
1,249,423.
Patented Dec. 11, 1917.
2 SHEETS—SHEET 1.
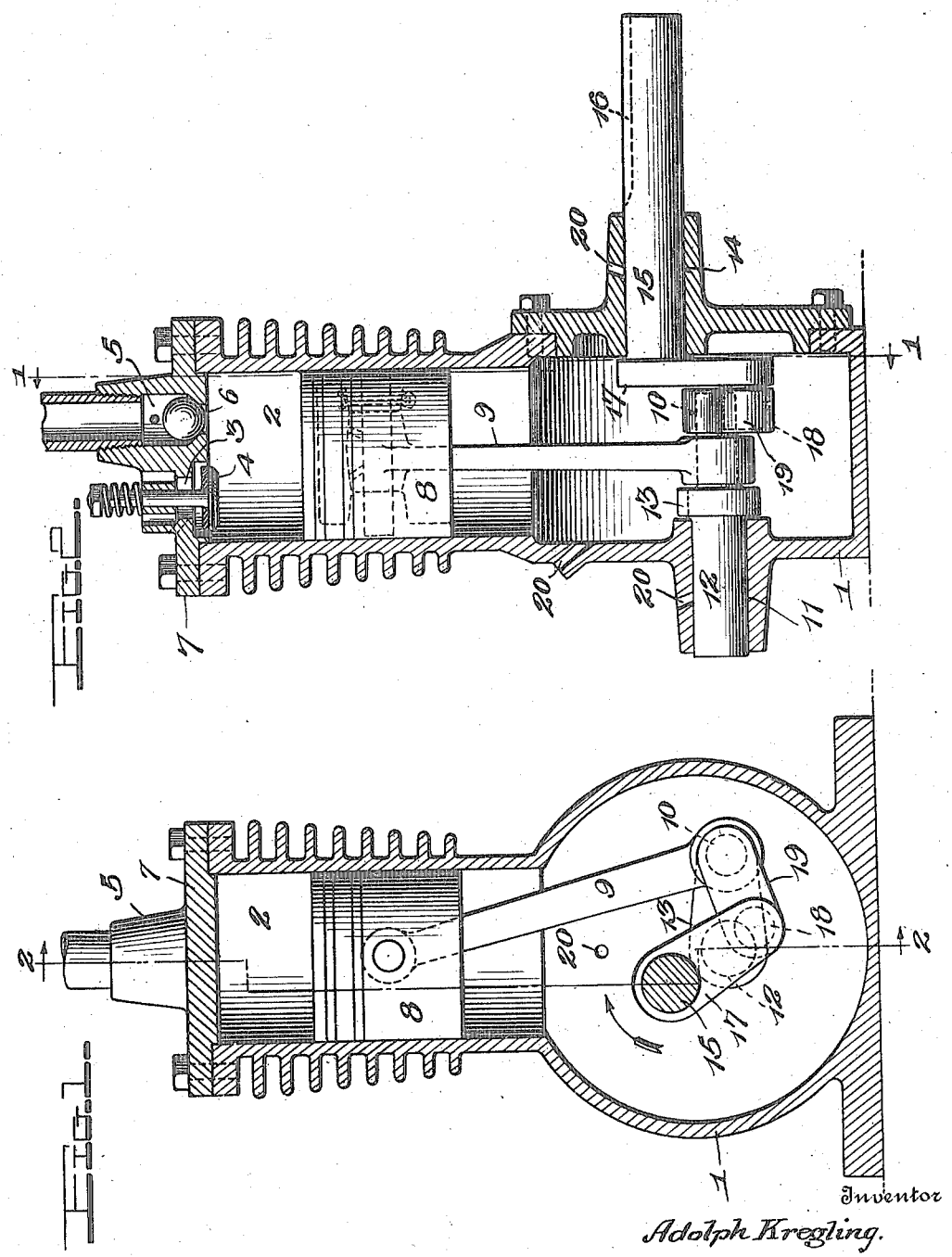
Inventor
Adolph Kregling.
By
Attorney

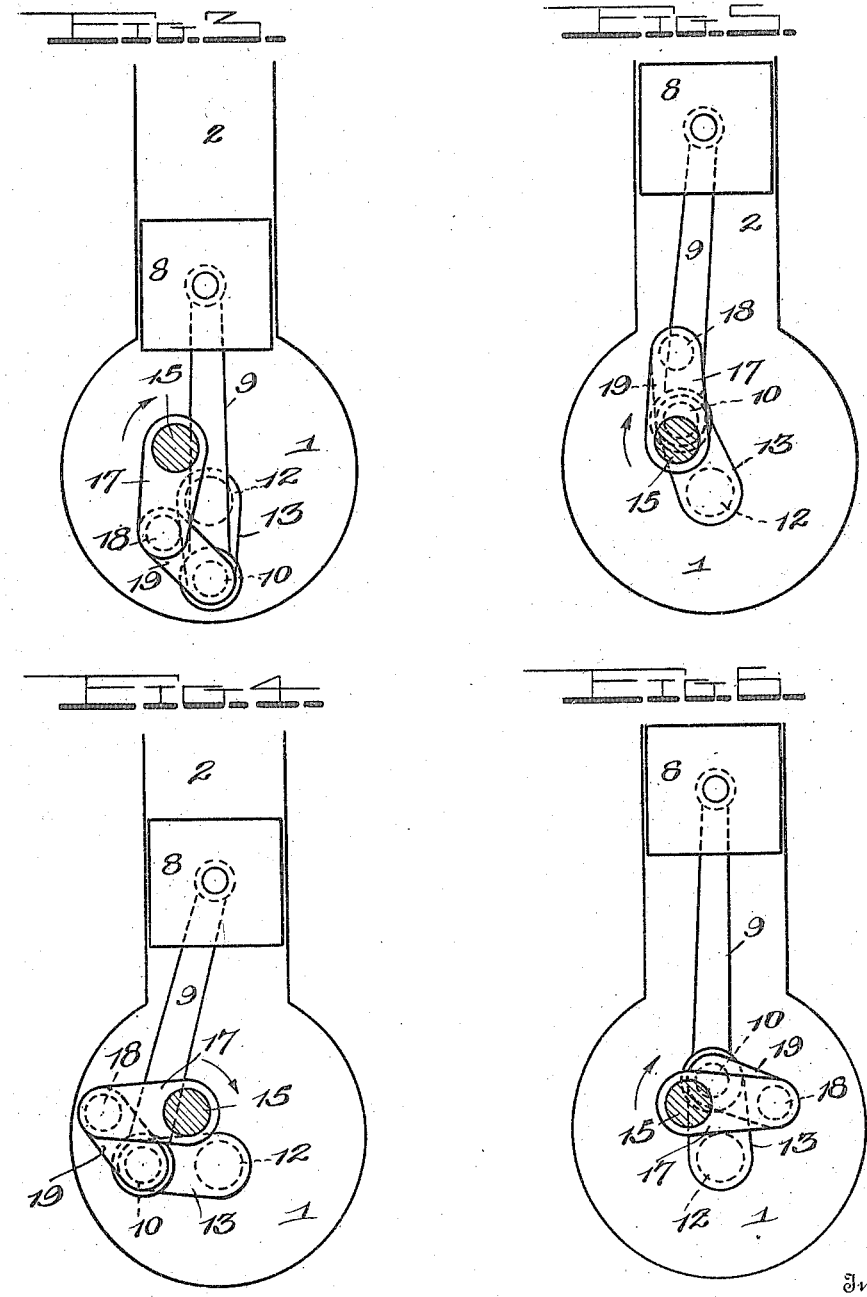

UNITED STATES PATENT OFFICE.

ADOLPH KREGLING, OF BRIDGEPORT, CONNECTICUT.

MECHANICAL MOVEMENT.

1,249,423.  Specification of Letters Patent.  Patented Dec. 11, 1917.

Application filed February 5, 1917. Serial No. 146,698.

*To all whom it may concern:*

Be it known that I, ADOLPH KREGLING, a citizen of the United States, residing at the city of Bridgeport, county of Fairfield, State of Connecticut, have invented certain new and useful Improvements in Mechanical Movements; and I do declare the following to be a full, clear, and exact description of the invention, such as will enable others skilled in the art to which it appertains to make and use the same.

This invention relates especially to a mechanism for embodiment in an air compressor which is especially adapted not only as an air compressor for all purposes but also for attachment on an automobile for furnishing compressed air particularly in inflating tires.

The primary object resides in an improved piston-operating mechanism for gradually reducing the speed of the piston on its compression stroke and effecting a rapid return stroke of the same, whereby the load on the motor is reduced to a minimum.

The invention further resides in the features of construction, and the arrangements and combinations of parts hereinafter described and claimed reference being had to the accompanying drawings wherein—

Figure 1 is a vertical section on line 1—1 of Fig. 2 showing the interior and working mechanism of the improved air compressor;

Fig. 2 is a similar section on line 2—2 of Fig. 1 taken at right angles to that of the latter;

Figs. 3, 4, 5 and 6 are diagrammatic views illustrating four positions which the piston-operating means assumes during its cycle of operation.

Referring now in detail to the drawings, the numeral 1 designates the crank case or engine base and 2 the cylinder or pump chamber which has an intake 3, that is controlled by a spring actuated valve 4, and an outlet 5, that is closed by a ball valve 6, said intake and outlet being provided in the cylinder head 7.

The piston 8 is reciprocable in the cylinder 2 and is pivotally connected by a piston rod 9 to a crank pin 10 that extends from opposite sides of the rod.

In one side of the crank case is a bearing 11 in which is journaled a shaft 12 that has a fixedly mounted crank arm 13 to the outer end of which the crank pin is swiveled. The opposite side of the crank case is removable and is also provided with a shaft bearing 14 in which is journaled the drive shaft 15, the outer, projecting end of said shaft being grooved at 16, or otherwise formed, to be coupled to a source of power (not shown). Fixed on the inner end of shaft 15 is a crank arm 17 that carries a swiveled crank pin 18 on its outer free end.

The bearing 14 is disposed in a plane above that including the bearing 11 so as to mount the shaft 15 eccentrically relative to the shaft 12. Thus, the crank arms 13 and 17 rotate in circles that are axially offset.

A connecting link 19 joins the crank pins 10 and 18, having swivel connection with each, so that as the shaft 15 is rotated, rotary movement will be imparted to shaft 12 and the piston reciprocated. This link connects the outer end of the drive crank arm 17 to the outer end of the eccentrically related crank arm 13 for driving the latter and affording the desired motion to the piston.

Suitable oil ducts 20 are provided for conveniently supplying a lubricant to the bearings and crank case, as is apparent.

By referring to Figs. 3 to 6, inclusive, with the crank arms divergently related as depicted in Fig. 3, and power being applied to the drive crank member, the arm will rotate in the direction of the arrow and pull the arm 13 with it, through the instrumentality of connecting link 19. In Fig. 4, the drive crank has revolved substantially a quarter turn during which the initial compressive movement of the piston has been comparatively fast. During the next quarter turn of shaft 15, as viewed in Fig. 5, the movement of the piston will gradually decrease as the center lines of the crank arms 13 and 17 and link 19 approach a common line or coinciding relation. The connecting link 19 being shorter than crank arm 17, the former will continue to pull on the crank pin 10 during the next succeeding quarter turn but at a very much reduced speed. The exceedingly slow movement of the piston is caused by the arm 17 and link 19 swinging into coincidence, after which the continued rotation of crank arm 17 will swing the link about its pivotal mounting 10, the latter passing from one side of the center line of arm 17 to the opposite side, as shown in Figs. 5 and 6. The arc which the crank pin traverses is exceedingly small and, consequently, the extent of movement of the piston is very small. During this third quarter turn of the drive shaft 15, the link 19 swings in a much freer manner about the pin 10 through the breaking of the toggle relation between said link and the crank arm 13. The fourth quarter turn of shaft 15 brings the related parts from the position depicted in Fig. 6 to that shown in Fig. 3. During this last quarter turn, the link 19 and arm 13 register at which moment the pin 10 is practically free to swing about the shaft 12, or, in other words, practically no resistance is offered the swinging of crank arm 13. The approach and crossing of the center lines of link 19 and arm 13 is accelerated by the fact that pivot 18 is swung almost directly toward the pivot 12 of arm 13. Consequently, this quarter revolution of shaft 15 effects substantially a half revolution of shaft 12 and a quick and complete return stroke of the piston.

Therefore, the working or compression stroke requires practically three-quarters of a revolution of shaft 15 and the return stroke the remaining quarter revolution. The third quarter, or the last quarter revolution of the compression stroke moves the piston a comparatively small distance, a very practical operation since the last part of a compression stroke is offered the greatest resistance and requires the greatest force. This operation affords a comparatively large movement of the drive for the final compressive action of the piston and thereby relieves the drive from undue strain. Further, the compression stroke from the start is gradually decreased so that the load on the motor is reduced to a minimum.

The air compressor operates on a very economical basis, greatly relieving the motor by graduating the load thrown thereon. The pump is not limited in its use, although it is primarily intended for use on an automobile to which it may be connected, as through the cam shaft or other suitable rotary part (not shown). A higher pressure is obviously obtainable by this particular movement, and the construction is rendered more durable and efficient.

What is claimed is:

In a mechanical movement, in combination, a fixedly mounted drive shaft, a fixedly mounted driven shaft eccentrically disposed relative thereto, a crank arm fixed on each shaft, a crank pin carried on the outer end of each crank arm and extending toward each other, the driven crank pin being longer than the driving crank pin, a rigid connecting link between the latter and the driven crank pin, and a reciprocatory rod pivotally connected to the driven crank pin and arranged between the driven crank and the connecting link.

In testimony whereof I affix my signature in presence of two witnesses.

ADOLPH KREGLING.

Witnesses:
F. W. SMITH, Jr.,
M. T. LONGDEN.

Copies of this patent may be obtained for five cents each, by addressing the "Commissioner of Patents, Washington, D. C."